United States Patent
Del Vecchio et al.

(10) Patent No.: US 6,331,251 B1
(45) Date of Patent: Dec. 18, 2001

(54) SYSTEM AND METHOD FOR WITHDRAWING PERMEATE THROUGH A FILTER AND FOR CLEANING THE FILTER IN SITU

(75) Inventors: Michael Arthur Del Vecchio, Flemington; Robert Eben Loudon, Howell, both of NJ (US); Paul Matthew Sutton, Danbury, CT (US)

(73) Assignee: Envirogen, Inc., Lawrenceville, NJ (US)

( * ) Notice: Subject to any disclaimer, the term of this patent is extended or adjusted under 35 U.S.C. 154(b) by 0 days.

(21) Appl. No.: 09/329,538

(22) Filed: Jun. 10, 1999

(51) Int. Cl.$^7$ ................................................. B01D 65/02
(52) U.S. Cl. .................. 210/636; 210/195.2; 210/257.2; 210/321.69; 210/500.23; 210/805
(58) Field of Search .................... 210/139, 194, 210/195.2, 257.2, 321.69, 636, 805, 247, 500.23, 650

(56) References Cited

U.S. PATENT DOCUMENTS

| | | | |
|---|---|---|---|
| 4,921,610 | * 5/1990 | Ford et al. | 210/321.69 |
| 5,248,424 | 9/1993 | Cole et al. | 210/636 |
| 5,372,722 | * 12/1994 | Schwering et al. | 210/636 |
| 5,403,479 | 4/1995 | Smith et al. | 210/321.69 |
| 5,607,593 | 3/1997 | Cote et al. | 210/650 |
| 5,639,373 | 6/1997 | Mahendran et al. | 210/636 |
| 5,643,455 | * 7/1997 | Kopp et al. | 210/321.69 |
| 5,783,083 | 7/1998 | Henshaw et al. | 210/636 |
| 5,958,243 | * 9/1999 | Del Vecchio et al. | 210/636 |

FOREIGN PATENT DOCUMENTS

| | | |
|---|---|---|
| 40 37 329 | 5/1992 | (DE) . |
| 4-131182 | * 5/1992 | (JP) ............. 210/321.69 |
| 10057780 | 3/1998 | (JP) . |
| 10057958 | 3/1998 | (JP) . |
| 11128701 | 5/1999 | (JP) . |
| WO 97/18887 | 5/1997 | (WO) . |
| WO 98/37950 | 9/1998 | (WO) . |
| WO 98/46533 | 10/1998 | (WO) . |

OTHER PUBLICATIONS

Written Opinion for Int'l Appln. No. PCT/US00/15316 dated Mar. 21, 2001.
D. Thompson et al., "Demonstration of the Zenogem® Process for Municipal Wastewater Treatment," Oct., 1998, pp. 1–8.
D. Mourato et al., "The Zenogem® Process for Municipal Sewage Treatment Plant Upgrades," Oct., 1996, pp. 1–12.
Brochure, "Zenon: Treating Water and Wastewater with Membrane Technology." Printed Apr. 1998.
D. Mourato, "The Use of Immersed Membrane Bioreactor for Municipal Sewage Treatment Plant Upgrades and Pretreatment to Reverse Osmosis," Apr. 1998, pp. 1–11.
"Demonstration of the ZenoGem® Process at the Milton (Halton Region) WPCP," Zenon Environmental Inc. No date.

* cited by examiner

Primary Examiner—Joseph W. Drodge
(74) Attorney, Agent, or Firm—Ratner & Prestia

(57) ABSTRACT

A system is provided for withdrawing permeate from a substrate through a filter and for cleaning the filter in situ. The system includes a vessel configured to contain a substrate and a compartment connected to receive substrate from the vessel and connected to return a portion of received substrate to the vessel during normal operation of the system. The system also includes a filter positioned at least partially within the compartment to withdraw permeate from substrate in the compartment during normal operation of the system. A source of cleaning solution is connected to the compartment to deliver cleaning solution into the compartment and into contact with the filter during cleaning operation of the system. The compartment facilitates circulation of substrate in the vessel during normal operation of the system and substantially prevents introduction of cleaning solution from the compartment into contact with substrate contained in the vessel during cleaning operation. A method is also provided.

26 Claims, 3 Drawing Sheets

SYSTEM AND METHOD FOR WITHDRAWING PERMEATE THROUGH A FILTER AND FOR CLEANING THE FILTER IN SITU

BACKGROUND OF THE INVENTION

1. Field of the Invention

This invention relates to a system for withdrawing permeate from a substrate through a filter. More particularly, this invention relates to a system adapted for withdrawing permeate from a substrate through a filter and for cleaning the filter in situ. A method is also provided.

2. Related Art

Filtration systems provide barriers in order to allow permeate to be drawn off from a substrate through the filter while concentrate is left behind. For example, filtration systems have been used as barriers to retain biosolids in biological reactors. In such filtration systems, membranes have been proposed as the barrier. Such membranes can be provided in the form of hollow fibers, tubes, or rolls, for example.

For the purpose of illustration, leachate treatment systems for wastewater treatment applications may use a membrane separator in order to separate feed into permeate and biomass. Such systems are available, for example, under the trademark ZEEWEED from Zenon Environmental Inc. of Ontario, Canada. The ZEEWEED system uses a submersible membrane cassette to bring about bio-oxidation to oxidize organic matter in the feed. Membranes are used to retain bacteria in the system for essentially complete oxidation and to provide high effluent quality.

It has been recognized that it is important to keep membranes used in such systems "clean" because, after some period of use, a fouling film or "bio-film" can form on the membrane, thereby reducing the flow of permeate through the membrane. A buildup, whether organic or inorganic, may form on the membrane's outer surface, inner surface, and/or in the membrane's pores that extend through the membrane's wall. Such a buildup on the membrane has, therefore, been recognized to decrease the performance of the membrane as a viable filter.

U.S. Pat. No. 5,403,479, issued to Smith et al. ("In Situ Cleaning System for Fouled Membranes") provides ample background as to the nature and extent of the fouling problem that tends to plague the bio-filtration industry. U.S. Pat. No. 5,403,479 is incorporated herein by reference in its entirety. As one possible solution to the problem of membrane fouling, Smith et al. proposed in the '479 patent a cleaning system for substantially restoring transmembrane flux in fouled, porous/semipermeable microfiltration or ultrafiltration membranes used to recover purified water from contaminated or "dirty" water. Specifically, Smith et al. proposed cleaning a module containing a membrane, without draining feed from the module, by introducing a chosen cleaning fluid into the permeate and recycling it through the lumens of hollow fiber membranes at low pressure not exceeding the bubble point of the fiber. The process proposed by Smith et al. in the '479 patent cleans from the permeate side of the membrane; that is, through the lumens of the hollow fibers.

U.S. Pat. No. 5,248,424, issued to Cote et al. ("Frameless Array of Hollow Fiber Membranes and Method of Maintaining Clean Fiber Surfaces While Filtering a Substrate to Withdraw a Permeate") proposed another approach for maintaining the performance of filtration membranes; more specifically, a frameless array of hollow fibers. Cote et al. proposed in the '424 patent a system to reduce the build-up of growing microbes or the deposits of inanimate particles upon the surfaces of fibers kept awash in bubbles of a fiber-cleansing gas ("scrubbing gas"), particularly an oxygen-containing gas ("air-scrubbed"). The build-up is essentially naked when the fibers are buoyantly freely swayable in a frameless array submerged in a substrate through which the bubbles rise with sufficient physical force of impact to keep the fibers essentially free of deleterious deposits. Similar solutions were proposed by Mahendran et al. in U.S. Pat. No. 5,639,373 ("Vertical Skein of Hollow Fiber Membranes and Method of Maintaining Clean Fiber Surfaces While Filtering a Substrate to Withdraw a Permeate") and by Henshaw et al. in U.S. Pat. No. 5,783,083 ("Vertical Cylindrical Skein of Hollow Fiber Membranes and Method of Maintaining Clean Fiber Surfaces").

In International Publication No. WO 98/37950 ("Portable Reverse Osmosis Unit for Producing Drinking Water"), Daly et al. proposed a method and apparatus for producing drinking water from impure water wherein hollow tubular membranes of the system are periodically back flushed with retentate by directing the retentate to the inside surfaces of the membranes and by passing the retentate through the membranes, thereby dislodging particles from the outside surfaces. When chemical cleaning of the membranes is required in the method and apparatus proposed in the '950 publication, cleaning solution is pumped from a tank into the membranes.

In Australian Patent Application No. AU 9676300 (corresponding to International Publication No. WO 97/18887), Cote et al. described a method for cleaning immersed membranes in situ, wherein effluent contained in the tank is at least partially emptied in order to expose the membranes to the air, and cleaning solutions are passed through the pores of the membranes along a flow path opposite to the filtration flow of the effluent by delivering cleaning solution to the permeate side of the membranes. A shut-off valve is opened in order to drain off effluent from a treatment tank. Cleaning solution is then introduced into the membranes from a reservoir. In another embodiment, four tanks are supplied with effluent. When one wishes to clean the membranes in one of the tanks, the contents of the selected tank are transferred into the other tanks. Cleaning solutions are fed into the membranes of the empty, selected tank from reservoirs.

Although significant effort has been expended to resolve this recognized problem of fouling, improvements regarding the "cleaning" of filtration systems such as those that employ membranes are still in demand, whether the membranes are provided in the form of hollow fibers, tubes, rolls, or other membrane configurations. Specifically, despite these significant advances in the art of filter cleaning, and despite the purported ability of such proposed systems to prolong the throughput rate of the membranes used as filters, it has been discovered that, in some instances, the membranes must eventually be removed from the process for a thorough cleaning such as a deep chemical cleaning. The need to remove a filter from a system such as a biological reactor is of course time consuming, expensive, labor intensive, and generally undesirable. Moreover, it often requires that the system be at least partially shut down during the cleaning process while the filter is removed.

For example, it is undesirable to remove a submersible membrane unit from a biological reactor and to move the submersible membrane unit to a separate tank for cleaning. Membrane assemblies can be quite large and quite heavy.

Also, in the case of an industrial biological reaction system, the biological reactor vessels in which membrane assemblies are used can be quite tall, thereby requiring expensive and cumbersome rigging equipment for removal. Furthermore, the various "plumbing" connections to such membrane assemblies must be disconnected and subsequently reconnected in order to bring about membrane assembly removal and replacement, respectively. It will also be understood that over-head clearance may not be available for removing such membrane assemblies easily, and when such systems are removed, the process of doing so can create quite a mess. Also, external tanks dedicated to separate cleaning operations for off-line cleaning procedures require significant floor or ground space and numerous "plumbing" connections.

Accordingly, the need remains for an improved system for withdrawing permeate from a substrate through a filter and for cleaning the filter in situ. A corresponding method is also needed.

SUMMARY OF THE INVENTION

A system is provided according to this invention for withdrawing permeate from a substrate through a filter and for cleaning the filter in situ. The system includes a vessel that is configured to contain a substrate. A compartment is provided as part of the system, the compartment being positioned to receive substrate from the vessel. The compartment is also positioned to return a portion of received substrate to the vessel during normal operation of the system.

The system also includes a filter that is positioned at least partially within the compartment and that is connected to withdraw permeate from substrate in the compartment during normal operation of the system. A source of cleaning solution is preferably connected to the compartment in order to introduce cleaning solution into the compartment and into contact with the filter during cleaning operation of the system.

In the system according to this invention, the compartment facilitates circulation of substrate during normal operation of the system. The compartment also makes it possible to substantially prevent the introduction of cleaning solution from the compartment into contact with substrate contained in the vessel during the cleaning operation of the system. Accordingly, the system of this invention is adapted for withdrawing permeate from a substrate through the filter and for cleaning the filter in situ in order to avoid the need for periodic removal of the filter.

A method is also provided for withdrawing permeate from a substrate through a filter and for cleaning the filter in situ. The method includes the steps of providing a compartment to at least partially surround the filter. During normal operation of the filter, substrate is introduced from a vessel into the compartment, permeate is withdrawn through the filter from substrate received in the compartment, and a portion of received substrate is returned from the compartment to the vessel. During cleaning operation of the filter, flow of substrate into the compartment is prevented, permeate is returned to the compartment, and a cleaning solution is preferably introduced into the compartment and into contact with the filter, all while maintaining the filter in situ.

DETAILED DESCRIPTION OF THE INVENTION

Features of this invention will now be described with reference to figures which illustrate selected embodiments of the invention. It will be appreciated that this invention is not limited to the embodiments selected for illustrated in the figures and that the scope of the invention is separately defined in the appended claims. It will also be appreciated that the figures are not drawn to any particular proportion or scale, and that the embodiments illustrated in the figures can be modified or varied without departing from the spirit or scope of this invention.

Figure 1:
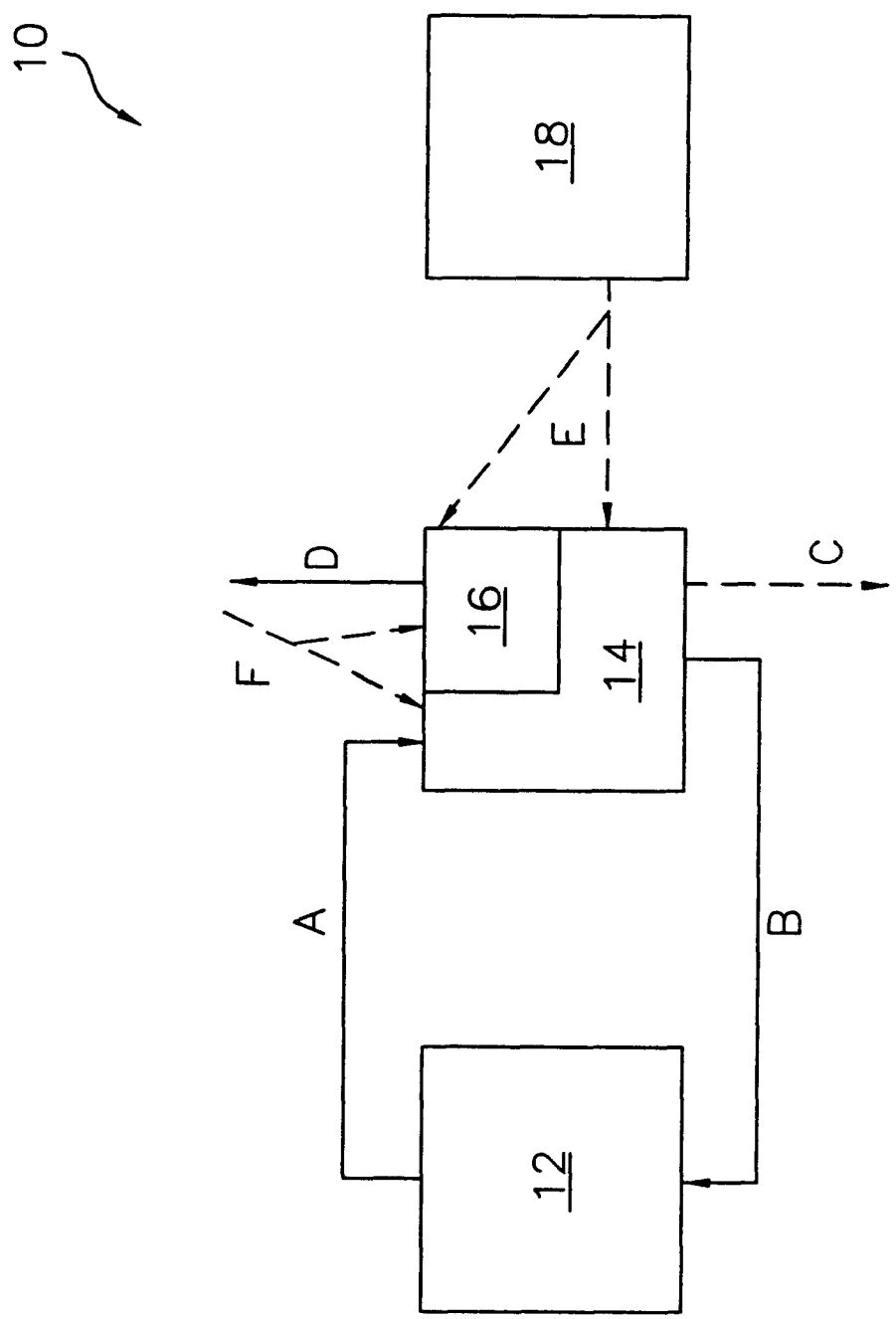
FIG. 1 is a block diagram of an embodiment of a system and method according to this invention.

Features of this invention will now be described with reference to the block diagram provided in FIG. 1. More specifically, FIG. 1 illustrates a system for withdrawing permeate from a substrate through a filter and for at least partially cleaning the filter in situ. The illustrated system 10 includes a vessel 12 that is configured to contain substrate. The composition of the substrate can vary while still achieving the benefits of this invention, but the substrate is most frequently a liquid or a slurry of liquid and solid particles.

System 10 also includes a compartment 14 connected to receive substrate from vessel 12, wherein the flow of substrate from vessel 12 to compartment 14 is indicated at A in FIG. 1. Compartment 14 is also connected to return a portion of received substrate to vessel 12 during normal operation of the system 10. For example, the return flow of substrate from compartment 14 to vessel 12 is indicated at B in FIG. 1. Compartment 14 also includes an opening for discharge from system 10. More specifically, a discharge flow is indicated at C in FIG. 1.

A filter 16 is positioned at least partially within compartment 14. Filter 16 is connected to withdraw permeate from substrate in compartment 14 during normal operation of the system 10. For example, permeate flow from filter 16 is indicated at D in FIG. 1.

System 10 also includes a source 18 of cleaning solution. Source 18 is connected to introduce cleaning solution into compartment 14 and into contact with filter 16 during cleaning operation of system 10. For example, the flow of cleaning solution from source 18 to compartment 14 is indicated at E in FIG. 1.

The compartment 14 of system 10 facilitates the circulation of substrate through the system 10 during normal operation of the system. More specifically, substrate can be circulated by flow at A from vessel 12 to compartment 14 and by flow at B from compartment 14 to vessel 12. Also, compartment 14 substantially prevents the introduction of cleaning solution, received from source 18, from compartment 14 into contact with substrate contained in vessel 12.

Still referring to FIG. 1, an embodiment of a method according to this invention will now be described. System 10 illustrated in FIG. 1 is adapted for withdrawing permeate from a substrate through a filter and for at least partially cleaning the filter in situ. In use, compartment 14 is provided to at least partially surround filter 16. During normal operation of system 10, substrate is introduced from vessel 12 into compartment 14 in the form of flow at A. Permeate is withdrawn through filter 16 from substrate received in compartment 14 as indicated at D. Also during normal operation, a portion of received substrate is returned from compartment 14 to vessel 12 as indicated at B.

Cleaning operation of system 10 is illustrated in FIG. 1 by the use of dotted lines. More specifically, during cleaning operation, flow of substrate into compartment 14 from vessel 12 as indicated at A is prevented. Permeate is returned to compartment 14 and/or through filter 16 as indicated at F. Cleaning solution is introduced at E from source 18 into compartment 14 and/or filter 16 and into contact with external surfaces of filter 16. Cleaning solution may then be drained from compartment 14 as indicated at C, if necessary.

The method according to this invention is accomplished while maintaining the filter 16 in situ or in place with respect to compartment 14 and vessel 12. In other words, filter 16 is maintained in place during the normal operation of system 10 and during cleaning operation of system 10. Filter 16, therefore, need not be removed from compartment 14 to accomplish a deep cleaning.

Figure 2:
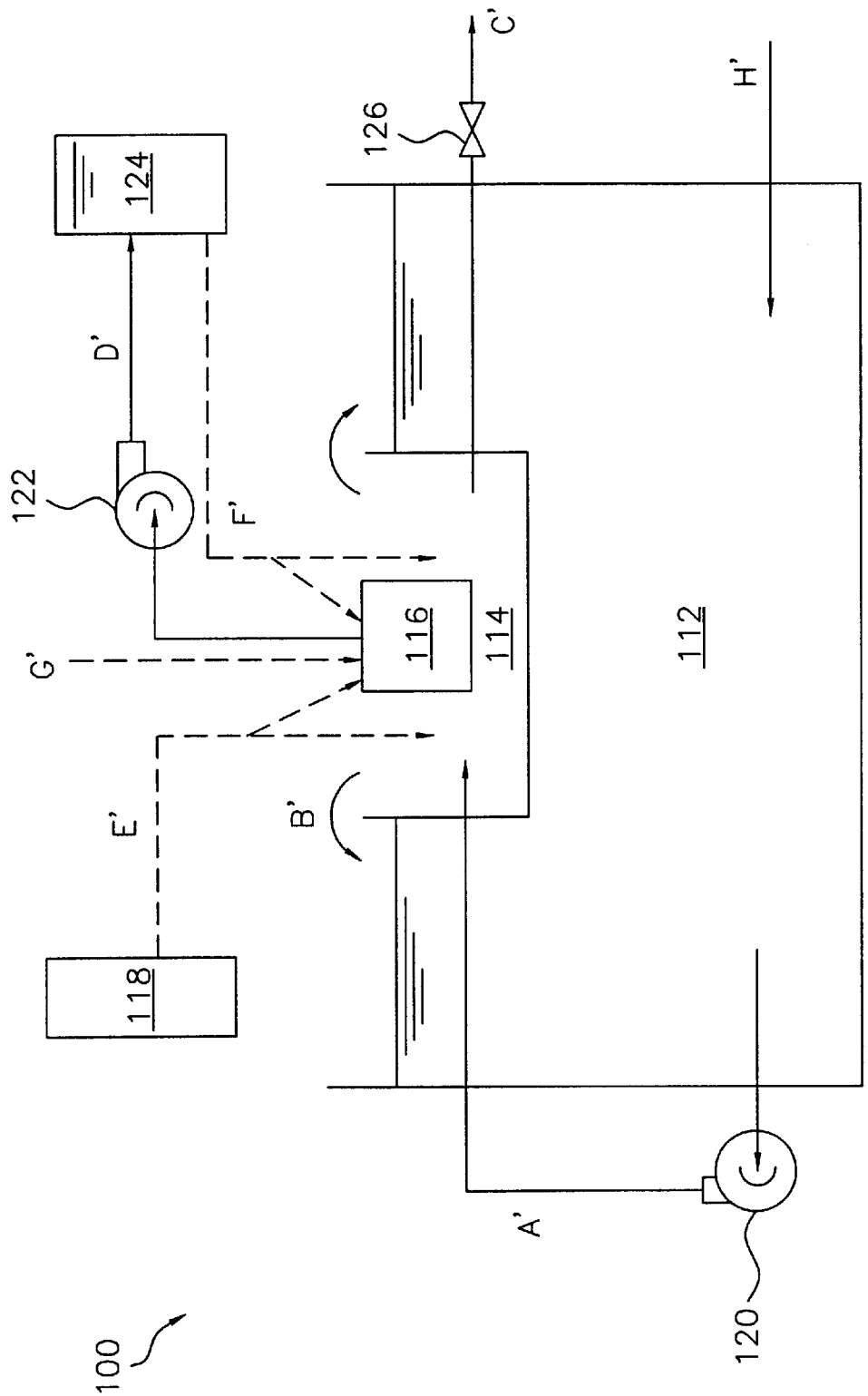
FIG. 2 is a schematic diagram of another embodiment of a system and method according to this invention.

Referring now to FIG. 2, a schematic diagram of another embodiment of a system and method according to this invention is provided. Like system 10, system 100 is adapted for withdrawing permeate from substrate through a filter 116 and for at least partially cleaning the filter 116 in situ.

System 100 includes a vessel 112 configured to contain substrate. In this embodiment, substrate is introduced into vessel 12 via a feed H'. System 100 also includes a compartment 114 connected to receive substrate from vessel 112. In this embodiment, substrate is delivered into compartment 114 from vessel 112 by means of a circulating pump 120 that urges substrate toward compartment 114 as indicated at A'. Compartment 114 is connected to return a portion of received substrate to vessel 112 during normal operation of the system.

In this embodiment, compartment 114 is positioned at least partially within vessel 112 and has an at least partially open top to permit the overflow of substrate from within compartment 114 into the interior of vessel 112 as indicated at B'. In order to prevent or reduce the tendency for concentration of biosolids in compartment 114, a significant portion of substrate received in compartment 114 is intended to return as indicated at B' into vessel 112. Preferably, the majority of substrate received in compartment 114 is returned to vessel 112. Compartment 114 also includes an opening for discharge from system 100. In this embodiment, a valve 126 is provided in order to control discharge flow as indicated at C'.

A filter 116 is positioned at least partially within, and preferably completely within, compartment 114. Filter 116 is connected to withdraw permeate from substrate in compartment 114 during normal operation of the system. In this embodiment, a permeate pump 122 is connected to filter 116 in order to deliver permeate from filter 116 to a permeate tank 124 as indicated at D'.

A source 118 of cleaning solution is connected to introduce cleaning solution into compartment 114 and into contact with external surfaces of filter 116 during cleaning operation of system 100. In this embodiment, source 118 delivers cleaning solution as indicated at E' so that it enters compartment 114 (and/or filter 116) for contact with filter 116.

Compartment 114 facilitates circulation of substrate through system 100 during normal operation of the system and substantially prevents the unintended introduction of cleaning solution from compartment 114 into contact with substrate contained within vessel 112 during cleaning operation.

Supplemental cleaning features can also be provided in system 100. For example, permeate can be returned through filter 116 in order to provide periodic back pulsing of filter 116 in order to facilitate partial cleaning of filter 116. Also, agitation air can be introduced proximal to filter 116 in order to cause the filter to vibrate and flex, although the source of such agitation air is not shown in FIG. 2.

During use of system 100, and during normal operation, substrate is introduced from vessel 112 into compartment 114 by means of circulating pump 120 as indicated at A'. Permeate is withdrawn through filter 116 from substrate received in compartment 114 and is delivered by means of permeate pump 122 to permeate tank 124 as indicated at D'. A portion of received substrate is returned from compartment 114 to vessel 112 as indicated at B'. The flow at B' is preferably greater than the flow at D'. Most preferably, the ratio of substrate flow at B' to the permeate flow at D' approaches or even exceeds 5:1.

Cleaning operation of system 100 is indicated by dotted lines. During cleaning operation of system 100, flow of substrate into compartment 114 from vessel 112 is prevented (by deactivation of circulating pump 120). Permeate is returned to compartment 114 and/or filter 116 from permeate tank 124 as indicated at F'. A cleaning solution is introduced from source 118 into compartment 114 (and/or filter 116) and into contact with surfaces of filter 116 as indicated at E'. Cleaning solution is subsequently drained from compartment 114 by means of opening valve 126 to induce flow at C'. In order to assist in the cleaning operation, agitation air or other gas can be introduced adjacent to filter 116 as indicated at G'.

In the embodiment illustrated in FIG. 2, a slurry of biosolids is circulated from a well-mixed reaction area within the vessel 112 through the compartment 114 at a rate equal to several times the permeate withdrawal rate. The excess biosolids slurry overflows the compartment 114, thereby returning to the reaction area in the vessel 112. The high rate preferred for overflow prevents undue concentration of biosolids in the compartment 114. Fresh feed liquid is added to the reactor vessel 112 (at H') at a rate about equal to the rate at which it is being withdrawn as permeate.

When periodic chemical cleaning is required, the compartment 114 is isolated and drained of liquid or slurry (by means of valve 126). The compartment 114 is then refilled with stored water previously processed through the membrane (from permeate tank 124) along with the cleaning chemicals. As described, air or other agitation can be applied during the cleaning period as indicated at G'. Following the cleaning period, the cleaning solution can be drained from the compartment 114, if necessary, and the compartment 114 can be refilled with biosolids liquid or slurry. The filter 116 can then be returned to normal operation.

This embodiment of the invention confers several significant benefits. Specifically, the filter does not have to be removed from the reactor vessel for cleaning. Accordingly, rigging equipment for filter removal is not required and the plumbing connections for the filter do not have to be disconnected/reconnected. System 100 also eliminates the need for an external cleaning tank in which to relocate the filter, thereby saving floor space and the associated plumbing. The time required for cleaning is accordingly reduced. Additionally, the introduction of the compartment, which at least partially surrounds the filter within the vessel, makes it unnecessary to discard or transfer a large volume of biosolids liquid or slurry or to provide a large volume of cleaning solution.

Figure 3:
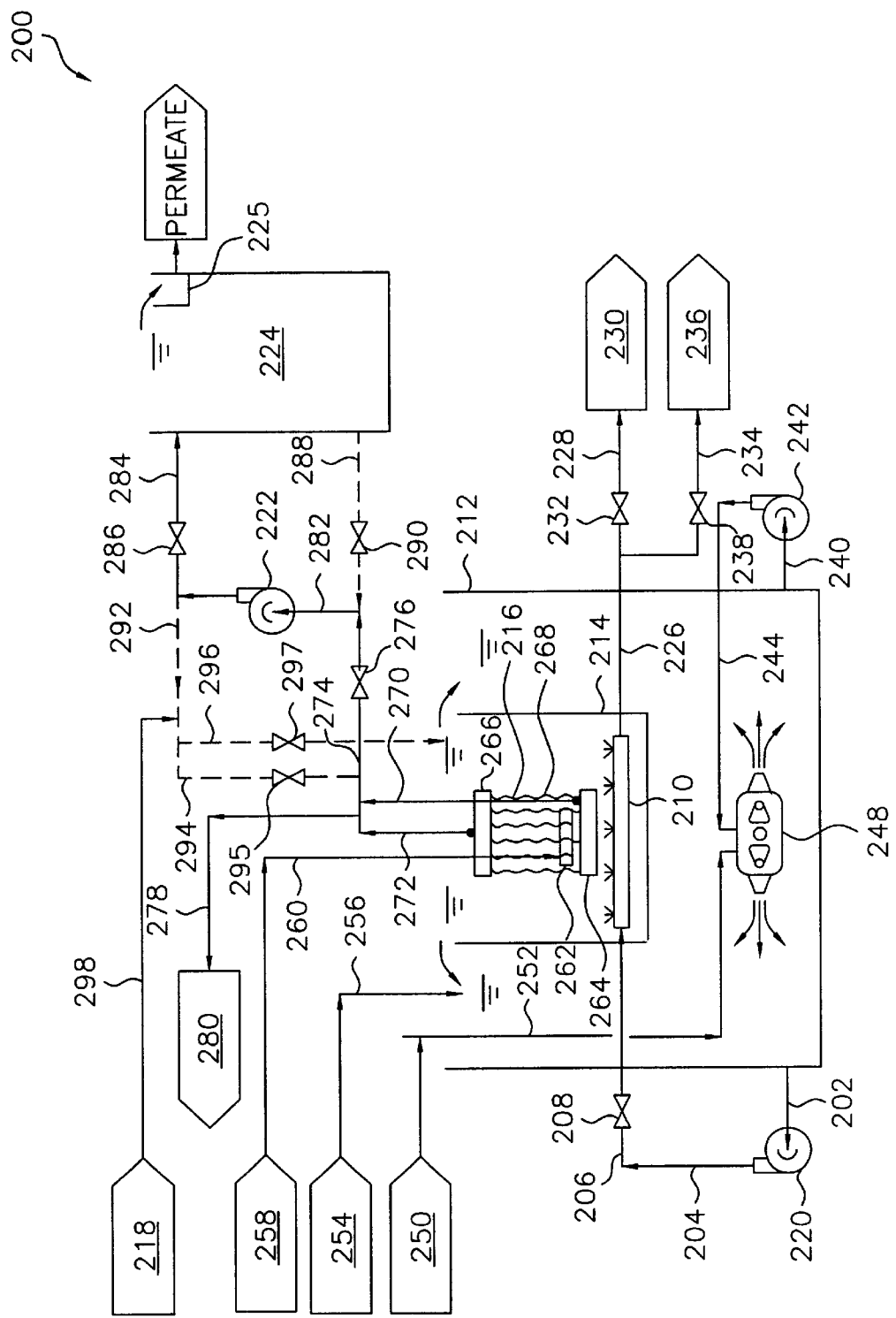
FIG. 3 is a schematic diagram of yet another embodiment of a system and method according to this invention.

Referring now to FIG. 3, a schematic diagram of yet another embodiment of a system and method according to this invention is illustrated. Like systems 10 and 100, system 200 illustrated in FIG. 2 is adapted for withdrawing permeate from substrate through a filter and for at least partially cleaning the filter in situ. Also, like system 100, system 200 utilizes a vessel 212, a compartment 214, a filter in the form of a membrane cartridge 216, a source of cleaning solution 218, a circulating pump 220, a permeate pump 222, and a permeate tank 224.

System 200 is provided with a feed source or substrate source 254. Feed source 254 is connected to a line 256 through which feed or substrate is introduced into the interior of vessel 212, as indicated in FIG. 3. Substrate is delivered into compartment 214 from vessel 212 by means of a circulating pump 220. More specifically, a line 202 extends from the wall of vessel 212 to circulating pump 220, and lines 204 and 206 extend from circulating pump 220 to a location within compartment 214, as will be described. A valve 208 is positioned along line 206 in order to control the flow of substrate between circulating pump 220 and compartment 214 through line 206.

Positioned within compartment 214 is a diffuser pipe 210 having a series of openings to permit the flow of substrate from within diffuser pipe 210 into the interior of compartment 214. Line 206 is connected to one end portion of diffuser pipe 210 in order to introduce substrate into the interior of diffuser pipe 210. Diffuser pipe 210 is preferably a straight pipe that extends substantially horizontally with respect to the bottom surface of compartment 214.

System 200 also includes means for delivering materials such as waste solids from compartment 214 or for draining compartment 214. More specifically, a line 226 extends from an end of diffuser pipe 210 (an end opposite the end connected to line 206) for the outflow from compartment 214 of waste solids as well as cleaning solutions, as will be described later. Line 226 is connected to a line 228 which, in turn, is connected to a waste solids receptacle 230. A valve 232 positioned along line 228 controls the flow of materials from compartment 214 and diffuser pipe 210 through line 228 to the waste solids receptacle 230.

A line 234 is also connected to line 226, which is in turn connected to a compartment drain 236. A valve 238 positioned along line 234 controls the flow of materials from compartment 214 and diffuser pipe 210 toward compartment drain 236 through line 234.

Vessel 212 is considered to be a "well mixed tank" because it is provided with a mixing pump that brings about circulation of substrate in vessel 212. The purpose is to keep biosolids suspended in the substrate during operation of system 200. More specifically, a line 240 extends from the wall of vessel 212 to deliver substrate from vessel 212 to a mixing pump 242. The mixing pump 242 urges substrate along a line 244 from line 240 so that it enters a mixer such as mixing eductor 248. Mixing eductor 248 can be provided in the form of a module such as a pod with radially oriented nozzles such as the embodiment shown in FIG. 3. Alternatively, mixing eductor 248 can be provided in the form of a pipe such as a straight pipe that extends at least partially across the diameter of vessel 212 with a series of outlet openings. The use of a straight pipe as opposed to a pod may be preferred for larger tanks that may have an extensive diameter. Other forms of an inlet such as eductor 248 are known in the art and can be substituted for the form illustrated in FIG. 3. Also known in the art are other forms of mixing with or without the use of air or other gases.

System 200 also includes a source 250 of mix air or other gas that travels along line 252, enters mixing eductor 248, and is introduced into the interior of vessel 212. The introduction of mix air into mixing eductor 248 for mixing with substrate creates agitation, which encourages the mixing of the substrate and the suspension of the biosolids within vessel 212. The introduction of air, if air is used, also provides a source of oxygen to support the biological activity that occurs within vessel 212.

System 200 also includes a membrane cartridge 216, which extends at least partially, and preferably completely, within the interior of compartment 214. The membrane cartridge of this embodiment is a submersible membrane filter having a series of hollow fiber membranes extending between manifolds. Permeate is extracted through membrane cartridge 216 by permeation through the walls of the hollow fiber membranes, transportation of the permeate through the membranes to the connected manifolds, and removal of permeate through a reduced-pressure piping system. More specifically, membrane cartridge 216 of system 200 has a bottom manifold 264, a top manifold 266, and a series of membranes such as hollow fiber membranes 268 extending substantially vertically between bottom manifold 264 and top manifold 266. Fibers 268 provide a barrier through which permeate is drawn during normal operation of system 200 in order to extract permeate from the substrate.

As will be understood, when a vacuum is drawn at the interior of the fibers 268, permeate is drawn through the walls of the hollow fibers 268 and into the interior of the hollow fibers 268 so that the permeate can be extracted via bottom and top manifolds 264 and 266 for extraction from the system 200. In other words, by creating a pressure differential across the thickness of the walls of hollow fibers 268, wherein the pressure on the outside of the fibers 268 is greater than the pressure within the interior of fibers 268, permeate is caused to flow through pores in the walls of the hollow fibers 268 and into the interior thereof for extraction from system 200. Biosolids such as bio-mass are blocked by the fibers 268 and remain in the compartment.

System 200 also includes a membrane air or other gas source 258 that introduces air or other gas into a line 260 so that it can be transported to an air manifold 262 that is positioned adjacent to or at least partially within membrane cartridge 216. The air manifold 262 includes air outlets or nozzles (not shown) which permit the flow of air bubbles adjacent to the membranes 268 of membrane cartridge 216. Such air bubbles can help to reduce the rate at which a film of bio-mass is formed on the outer surfaces of the membranes 268. Air from membrane air source 258 also tends to encourage the mixing of substrate (and cleaning solution, as will be described) within compartment 214.

Still referring to FIG. 3, a pair of lines 270, 272 extend upwardly from membrane cartridge 216, wherein line 270 is connected to permit the flow of permeate upwardly from bottom manifold 264 and line 272 is connected to permit the flow of permeate upwardly from top manifold 266. Lines 270 and 272 are connected to a line 274, and a valve 276 is provided along line 274 in order to control the flow of permeate through line 274.

Connected to line 274 is a line 278, which is in turn connected to an air vent 280 for the ventilation of undissolved air from the permeate that may have been introduced into the permeate from an outside source such as membrane air source 258. Also connected to line 274 is a line 282 that extends upwardly, and a permeate pump 222 is connected along line 282 in order to urge the flow of permeate through line 282.

As an alternative to the use of permeate pump 222, it has been discovered that gravity flow can be employed to transfer permeate from membrane cartridge 216 to a permeate tank 224 (or directly to a discharge). More specifically, if the elevation of the membrane cartridge 216 is maintained above that of the permeate in permeate tank 224, then permeate will flow from the membrane cartridge 216 to the permeate tank 224 by action of atmospheric pressure and a siphon effect. The configuration of compartment 214 and membrane cartridge 216 in the embodiment illustrated in FIG. 3 makes it possible, therefore, to eliminate permeate pump 222 and the energy required to run the pump if at least a portion of the permeate tank 224 is repositioned below the filter.

If "pulsed cleaning" is performed (as described later), it will be appreciated that a pump may be required to return permeate from permeate tank 224 to membrane cartridge 216 if the permeate tank 224 is positioned at an elevation below the filter. Such a pump would run less than permeate pump 222 because of the preferred intermittent nature of the "pulsed cleaning" operation (as described later) as compared to the substantially continuous running of permeate pump 222 during the cleaning operation.

Connected to line 282 is a line 284 on which a valve 286 is provided to control the flow through line 284. Line 284 is, in turn, connected to a permeate tank 224, which is adapted to contain and collect permeate extracted from the substrate in vessel 212. Permeate within permeate tank 224 overflows into a baffle 225 from which the permeate or effluent is removed from the system 200 for use or for further processing.

Connected to the bottom portion of permeate tank 224 is a line 288 for delivering permeate toward line 282. A valve 290 is provided along line 288 to control the flow of permeate from permeate tank 224 to line 282. Also connected to line 282 is a line 292 for the flow of permeate from line 282 to lines 294 and 296. Line 294 is provided with a valve 295 in order to control the flow of permeate therethrough, and line 296 is provided with a valve 297 to control the flow of permeate therethrough. Line 294 is connected between line 292 and line 274. In contrast, line 296 is connected between line 292 and compartment 214 for the delivery of flow into compartment 214.

The source of cleaning solution 218 is connected to line 292 by means of a line 298 that extends between source 218 and line 292 in order to permit the flow of cleaning solution from source 218 to the remainder of system 200. Among other known cleaning solutions, chlorine solutions are preferred.

The preferred operation of system 200 will now be described with reference to FIG. 3. Three general operations of the system will be described in terms of "normal operation" of system 200 during which permeate is extracted from the substrate, a "pulsed cleaning" of system 200 which preferably occurs periodically during normal operation, and a "deep cleaning" of system 200 which preferably occurs during an interruption of normal operation.

Generally, substrate is fed into vessel 212, circulated to compartment 214, and permeate is removed through membrane cartridge 216 during normal operation of system 200. Permeate is delivered to permeate tank 224 or, alternatively, directly to discharge. At the same time, substrate is mixed in vessel 212 to maintain a well mixed tank.

During pulsed cleaning, which preferably occurs periodically during normal operation of system 200, permeate is pulsed back into membrane cartridge 216 in a reverse flow direction (by pump or by atmospheric pressure) in order to help reduce the accumulation of biosolids or other organic or inorganic foulants on the surfaces of the fibers 268 of membrane cartridge 216. Such a pulsed cleaning operation can be conducted at timed intervals for a short duration. For example, and for purposes of illustration only, pulsed cleaning can be conducted twice per hour, each time for a pre-determined duration of about one minute. Other intervals (more or less frequent) and durations (longer or shorter) are of course contemplated.

During deep cleaning, substrate contained in compartment 214 is drained and replaced with a cleaning solution for a predetermined period of time in order to bring about a chemical cleaning of the fibers 268 of membrane cartridge 216. Thereafter, the cleaning solution can be drained and replaced with substrate from vessel 212, if necessary, to return system 200 to normal operation.

Each of the normal, pulsed cleaning, and deep cleaning operations will be described hereafter in greater detail. With regard to normal operation, circulating pump 220 is actuated and valve 208 is opened so that substrate can be urged from vessel 212 into diffuser pipe 210 for introduction into the interior of compartment 214. Valve 232 on line 228 can be periodically opened during normal operation in order to extract some of the biosolids that may otherwise accumulate within compartment 214. During normal operation, valve 238 on line 234 is closed in order to prevent the flow of substrate from compartment 214 toward compartment drain 236.

System 200 is designed so that the flow rate of substrate from vessel 212 into compartment 214 exceeds the flow rate of permeate from membrane cartridge 216 for removal from system 200. Accordingly, the flow rate into compartment 214 of substrate through diffuser pipe 210 is greater than the flow rate of permeate out of compartment 214. There will therefore be overflow of substrate over the upper edge or lip of compartment 214 into vessel 212. For purposes of illustrating one preferred embodiment of this invention, if the flow rate of permeate from membrane cartridge 216 is "X", and if the flow rate of substrate from vessel 212 into compartment 214 is "6X", then the rate of overflow of substrate from compartment 214 back into vessel 212 will be approximately "5X" (6X−X=5X). It should be noted that some additional outflow of material will occur through valve 232 and into waste solids receptacle 230 during normal operation of the system. Accordingly, in the example provided, it would be expected that the overflow of substrate from compartment 214 back into vessel 212 would actually be slightly less than 5X.

It has been discovered that the overflow of excess substrate from the compartment back into vessel confers several benefits. Primarily, such overflow provides additional circulation to system 200, thereby maintaining a more uniform suspension of bio-mass in the substrate. The overflow also helps to maintain the membrane cartridge within substrate in the compartment so that it remains completely submerged. The overflow also creates a flow pattern adjacent to the membrane cartridge so as to reduce the accumulation of bio-mass in the compartment and on the membrane surfaces.

Still during normal operation, permeate pump 222 is actuated and valves 276 and 286 are opened in order to draw permeate through the boundary provided by fibers 268, into bottom and top manifolds 264 and 266, through lines 270 and 272 to line 274, through line 282 and line 284, for delivery into the interior of permeate tank 224. Alternatively, as described previously, permeate pump 222 need not be used if the elevations of the fibers 268 and permeate tank 224 are adjusted such that atmospheric pressure causes the permeate to flow from the fibers to the tank.

Permeate then exits permeate tank 224 through baffled area 225 for use or for further processing. Alternatively, permeate can be delivered directly to a discharge when the permeate tank is filled or it can completely bypass the permeate tank. During such normal operation, valves 290, 295, and 297 are closed (except as indicated below during pulsed cleaning) in order to prevent the return of permeate toward membrane cartridge 216.

Also during normal operation of system 200, feed of substrate is introduced from feed source 254, through line 256, and into vessel 212. In order to maintain introduced substrate in a well mixed condition, mixing pump 242 is actuated, either periodically or continuously, in order to transfer substrate from vessel 212, through lines 240 and 244, and into mixing eductor 248. At the same time, mix air is introduced from a source 250 of mix air or other gas, through line 252, and into mixing eductor 248 to mix with the substrate. The nozzles on mixing eductor 248 deliver a mixture of substrate and mix air from mixing eductor 248 back into vessel 212 in order to maintain a well mixed tank.

Membrane air is also introduced during normal operation of system 200 from membrane air source 258, through line 260, through air manifold 262, and into compartment 214 adjacent to the fibers 268 of membrane cartridge 216. Membrane air thus introduced helps to provide agitation in the substrate adjacent to the fibers in order to reduce the tendency of bio-mass to settle in the form of a film on the surface of the fibers. Also during normal operation of system 200, air is vented from line 274, through line 278, to air vent 280 in order to discharge undissolved air from the system.

As described above, pulsed cleaning is preferably conducted at predetermined intervals and for predetermined durations throughout the normal operation of system 200. More specifically, at the designated intervals and for the designated duration, valves 290 and 295 are opened, and valves 276 and 286 are closed, so that permeate pump 222 (or atmospheric pressure as described above) can urge permeate from tank 224; through lines 288, 282, 292, 294, 270, and 272; and into manifolds 264 and 266, for flow into fibers 268. This reverse flow causes permeate to flow in the opposite direction of normal operation through the fiber walls in such a manner as to reduce the build up of bio-mass on the outer walls of the fibers. As permeate is introduced along line 292, it is preferably mixed with cleaning solution introduced from source 218 along line 298.

The deep cleaning operation of system 200 will now be described, again with reference to the system 200 illustrated in FIG. 3. Initially, to end normal operation of system 200, the delivery of substrate from vessel 212 into compartment 214 is interrupted by deactivating circulating pump 220 and closing valve 208. Substrate within compartment 214 is then drained by closing valve 232 and opening valve 238 so that the substrate in compartment 214 is drained along lines 226 and 234 into compartment drain 236. This draining procedure is facilitated by the flow of substrate through the openings in diffuser pipe 210 for flow from the interior of diffuser pipe 210 into connected line 226.

Valves 276, 286, and 295 are closed, and permeate pump 222 is actuated, in order to deliver permeate from permeate tank 224; through lines 288, 282, 292, and 296; and into compartment 214. Cleaning solution is simultaneously delivered from source 218 along line 298 to mix with the introduced permeate in line 292. Compartment 214 is filled with a mixture of permeate and cleaning solution until it preferably reaches a height above the top manifold 266 of membrane cartridge 216 (so that the membrane cartridge will be fully submerged in the permeate/cleaning solution mixture) but below the upper lip of compartment 214 (so that the permeate/cleaning solution mixture will not flow over the edge of the compartment into the interior of vessel 212 for mixture with the substrate that is still within the interior of vessel 212). Accordingly, the substrate within vessel 212 will not be contacted by a substantial amount of cleaning solution and, therefore, the cleaning solution will be prevented from attacking the bio-mass in the substrate, which could otherwise compromise the ability of the bio-mass to treat the substrate.

The membrane cartridge 216 is then "soaked" in the cleaning solution for a predetermined period of time in order to eliminate or reduce the amount of bio-mass that may have accumulated on the surfaces of the fibers 268 of the membrane cartridge 216. Although various durations may be selected depending on the particular constituents of the substrate and biomass and other factors, the duration of the cleaning operation is preferably several hours and preferably as long as four hours or longer. Such "deep cleaning" may be advantageously performed once per month of normal operation or at more or less frequent intervals depending on the needs of the system and the rate at which a bio-film is generated on the fibers. In conjunction with the soaking of the membrane cartridge 216 in cleaning solution for the predetermined duration, membrane air can optionally be added from membrane air source 258 along line 260 and through air manifold 262 in order to provide additional agitation for the removal of bio-mass from the surface of the fibers 268.

In addition to the addition of membrane air (or as an alternative to membrane air), the pulsed cleaning operation described previously can be performed during the cleaning operation in order to introduce permeate (with or without cleaning solution) into the interior of fibers 268 for reverse flow through membrane cartridge 216. Such a combination of pulsed cleaning and deep cleaning can be advantageous to accelerate the elimination of bio-mass from the fiber surfaces.

After the selected duration of the cleaning cycle has elapsed, the valve 238 can be opened so that cleaning solution can be drained from compartment 214 through diffuser pipe 210, lines 226 and 234, for delivery to compartment drain 236. After the cleaning solution has been drained from compartment 214, the normal operation of system 200 (described above) can be restarted by once again introducing substrate from vessel 212 into compartment 214.

Alternatively, if the cleaning solution is neutralized or consumed during the duration of the cleaning operation, then it is possible to proceed directly to normal operation of system 200 without draining compartment 214. In other words, if the toxicity of the cleaning solution is degraded sufficiently during the cleaning operation so that it will not unduly inhibit the activity of the bio-mass, then substrate can simply be introduced into compartment 214 and into contact with the cleaning solution to bring about normal operation of system 200. The spent cleaning solution is then diluted in the substrate for mixture in compartment 214 and vessel 212. The ability to eliminate the draining step, whereby cleaning solution is drained from compartment 214 as described above, depends on the nature of the cleaning solution used, the volume of cleaning solution contained in compartment 214, the constituents of the bio-mass, the duration of the cleaning operation, and other factors.

This invention has been described with reference to particular exemplary embodiments selected for illustration in the drawings. It will be appreciated, however, that many variations and modifications of the embodiments selected for illustration can be made within the scope of the invention. The structure of the vessels and compartments illustrated schematically in FIGS. 2 and 3 can vary widely while maintaining the same function. The relative positioning of the compartment with respect to the vessel, whether the compartment is position wholly or partially within the vessel or outside the vessel, is not critical to the invention although the configurations depicted schematically in FIGS. 2 and 3 are preferred. The pipe and valve schemes diagramed in FIG. 3 can also be modified to be adapted to a particular use or a particular system. The type of filter used to withdraw permeate can vary even though preferred embodiments of the invention have been described with reference to submersible filters such as hollow fiber membranes.

Additional modifications and variations can be made without departing from the spirit or scope of the invention. The invention is defined separately in the appended claims.

What is claimed:

1. A system for withdrawing permeate from a substrate through a filter during operation of the system and for at least partially cleaning the filter in situ during cleaning of the system, said system comprising:
   a vessel configured to contain substrate;
   a compartment configured to receive substrate from said vessel and to return a portion of received substrate to said vessel during operation of the system;
   a filter positioned at least partially within said compartment and configured to separate permeate from substrate in said compartment during operation of the system;
   said system being configured for facilitating circulation of substrate during operation of the system and for containing cleaning solution in said compartment and substantially preventing cleaning solution from contacting substrate in said vessel during cleaning of the system.

2. The system recited in claim 1, further comprising a source of cleaning solution configured to introduce cleaning solution into said compartment and into contact with said filter during cleaning of the system.

3. The system recited in claim 1, said compartment having an opening for discharge of cleaning solution or substrate from the system.

4. The system recited in claim 1, further comprising a diffuser positioned within said compartment for receiving substrate delivered from said vessel and for introducing received substrate into said compartment.

5. The system recited in claim 1, said filter comprising a membrane through which permeate is separated during operation of the system.

6. The system recited in claim 5, said membrane comprising a plurality of hollow fibers.

7. The system recited in claim 1, said compartment defining an opening through which received substrate returns to said vessel.

8. The system recited in claim 7, said opening being positioned at a top portion of said compartment.

9. The system recited in claim 1, said filter being configured to be submerged in substrate during operation.

10. The system recited in claim 9, said filter being positioned completely within an interior of said compartment.

11. The system recited in claim 1, further comprising a tank connected to receive permeate separated by said filter.

12. The system recited in claim 1, further comprising a permeate discharge positioned at an elevation below said filter such that atmospheric pressure causes permeate to flow from said filter toward said permeate discharge.

13. A system for withdrawing permeate from a substrate through a filter during operation of the system and for at least partially cleaning the filter in situ during cleaning of the system, said system comprising:
   a vessel configured to contain substrate;
   a compartment configured to receive substrate from said vessel and to return a portion of received substrate to said vessel during operation of the system;
   a filter positioned at least partially within said compartment and configured to separate permeate from substrate in said compartment during operation of the system;
   said system being configured for facilitating circulation of substrate during operation of the system and for containing cleaning solution in said compartment and substantially preventing cleaning solution from contacting substrate in said vessel during cleaning of the system, said compartment being positioned at least partially within said vessel.

14. A method for withdrawing permeate from a substrate through a filter during operation and for at least partially cleaning the filter in situ during cleaning, said method comprising the steps of:
   (a) providing a compartment at least partially surrounding the filter;
   (b) during operation,
      (i) introducing substrate from a vessel into the compartment,
      (ii) returning a portion of received substrate from the compartment to the vessel, and
      (iii) withdrawing, through the filter, permeate from substrate received in the compartment; and
   (c) during cleaning,
      (i) preventing flow of substrate into the compartment from the vessel,
      (ii) introducing a cleaner into the compartment or filter, and
      (iii) at least partially submerging the filter to at least partially clean the filter, all while maintaining the filter in situ.

15. The method recited in claim 14, wherein the cleaner introducing step comprises introducing permeate, a chemical solution, or a combination of permeate and a chemical solution.

16. The method recited in claim 14, wherein the providing step includes positioning the filter completely within the interior of the compartment.

17. The method recited in claim 14, said returning step including returning a majority of received substrate from the compartment to the vessel.

18. The method recited in claim 14, further comprising the step, during operation, of maintaining the ratio of returned substrate to permeate at about 5:1.

19. The method recited in claim 14, further comprising the step of mixing substrate in the vessel.

20. The method recited in claim 14, further comprising the step, during cleaning, of draining cleaner from the compartment.

21. The method recited in claim 14, wherein operation and cleaning are alternated periodically.

22. The method recited in claim 14, said returning step causing circulation of received substrate adjacent to the filter to reduce the formation of a film on the filter.

23. The method recited in claim 14, further comprising the step, during cleaning, of returning to the filter a portion of permeate for reverse flow through the filter.

24. The method recited in claim 23, said step of returning permeate to the filter being performed periodically.

25. The method recited in claim 14, wherein the cleaner introducing step comprises introducing cleaner into the compartment through the filter.

26. A method for withdrawing permeate from a substrate through a filter during operation and for at least partially cleaning the filter in situ during cleaning, said method comprising the steps of:

a) providing a compartment at least partially surrounding the filter and positioning the compartment at least partially within the vessel;

(b) during operation,
  (i) introducing substrate from a vessel into the compartment,
  (ii) returning a portion of received substrate from the compartment to the vessel, and
  (iii) withdrawing, through the filter, permeate from substrate received in the compartment; and (c) during cleaning,
  (i) preventing flow of substrate into the compartment from the vessel,
  (ii) introducing a cleaner into the compartment or filter, and
    (iv) at least partially submerging the filter to at least partially clean the filter, all while maintaining the filter in situ.

* * * * *